(12) United States Patent
Jozwiak et al.

(10) Patent No.: US 9,187,062 B2
(45) Date of Patent: Nov. 17, 2015

(54) VEHICLE WINDSHIELD WIPER SYSTEM WITH ENERGY-ABSORBING FEATURE

(71) Applicant: GM GLOBAL TECHNOLOGY OPERATIONS LLC, Detroit, MI (US)

(72) Inventors: Thomas W. Jozwiak, Southgate, MI (US); Jay H. Ovenshire, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/055,256

(22) Filed: Oct. 16, 2013

(65) Prior Publication Data

US 2015/0102626 A1  Apr. 16, 2015

(51) Int. Cl.
*B60S 1/04* (2006.01)
*B60S 1/34* (2006.01)

(52) U.S. Cl.
CPC ............... *B60S 1/0488* (2013.01); *B60S 1/349* (2013.01); *B60S 1/3443* (2013.01); *B60S 1/3493* (2013.01); *B60S 1/0433* (2013.01); *B60S 1/342* (2013.01)

(58) Field of Classification Search
CPC ........ B60S 1/04; B60S 1/0488; B60S 1/3443; B60S 1/349; B60S 1/0433; B60S 1/342; B60S 1/3493
USPC ........................................................ 296/96.15
See application file for complete search history.

(56) References Cited

U.S. PATENT DOCUMENTS

| | | | | |
|---|---|---|---|---|
| 3,241,892 | A * | 3/1966 | Oishei | 384/222 |
| 7,185,390 | B2 * | 3/2007 | Buchanan, Jr. | 15/250.31 |
| 7,191,487 | B2 * | 3/2007 | Bissonnette et al. | 15/250.31 |

* cited by examiner

*Primary Examiner* — Glenn Dayoan
*Assistant Examiner* — Melissa A Black
(74) *Attorney, Agent, or Firm* — Quinn Law Group, PLLC (57) ABSTRACT

A windshield wiper system for a vehicle includes a wiper arm pivot shaft having a pivot axis extending through the pivot shaft. An energy-absorbing feature is arranged to absorb energy of an external force applied to the wiper arm pivot shaft. The energy-absorbing feature enables the wiper arm pivot shaft to move away from the external force.

13 Claims, 8 Drawing Sheets

VEHICLE WINDSHIELD WIPER SYSTEM WITH ENERGY-ABSORBING FEATURE

TECHNICAL FIELD

The present teachings generally relate to a windshield wiper system for a vehicle that has an energy-absorbing feature to absorb energy of an external force applied to a wiper arm pivot shaft.

BACKGROUND

Modern vehicles typically have a windshield forward of the passenger compartment. A windshield wiper system is positioned adjacent the windshield, and includes wiper arms that support wiper blades. The wiper arms pivot over a predefined range of motion on pivot shafts so that the blades oscillate over the windshield to clear precipitation. The pivot shaft is driven by a power source, such as an electrical motor, often via a linkage system that translates the rotation of the motor shaft into oscillating motion of the wiper arms. The pivot shaft may extend further forward than other exposed portions of the windshield wiper system, and thus may receive external forces applied toward the front of the vehicle. One known windshield wiper system has a pivot shaft holder with a stress concentration feature that causes the pivot shaft holder and pivot shaft to move away from the external force. The pivot shaft holder must then be replaced, however.

SUMMARY

A windshield wiper system for a vehicle includes a wiper arm pivot shaft having a pivot axis extending through the pivot shaft. An energy-absorbing feature is arranged to absorb energy of an external force applied to the wiper arm pivot shaft. The energy-absorbing feature enables the wiper arm pivot shaft to move away from the external force.

In one embodiment, the wiper arm pivot shaft has a first shaft portion and a second shaft portion operatively connected to the first shaft portion so that the first and the second shaft portions pivot in unison about the pivot axis of the pivot shaft. In this embodiment, the energy-absorbing feature is a biasing element configured such that the second shaft portion is biased away from the first shaft portion. This allows the second shaft portion to move toward the first shaft portion along the pivot axis when the external force is applied. The biasing element can be a spring. Alternatively, the energy-absorbing feature can be a fluid chamber between the shaft portions.

Other embodiments include a spring that extends along a structural support member between pivot shaft holders of first and second pivot shafts. Alternatively, the structural support member can be a matrix of a plastic base with fibers arranged to cause the structural support member to function as a leaf spring, allowing the pivot shaft or shafts to which the external force is applied to move away from the force. These embodiments may enable the components of the windshield wiper system to return to their initial position when the force is removed, and may not require replacement of any of the components. Another embodiment utilizes a shear pin between the pivot shaft holder and a mounting feature. The shear pin fractures when the applied force has a predetermined magnitude, allowing the pivot shaft to move away from the applied force along the pivot axis.

The above features and advantages and other features and advantages of the present teachings are readily apparent from the following detailed description of the best modes for carrying out the present teachings when taken in connection with the accompanying drawings.

DETAILED DESCRIPTION

Figure 1:
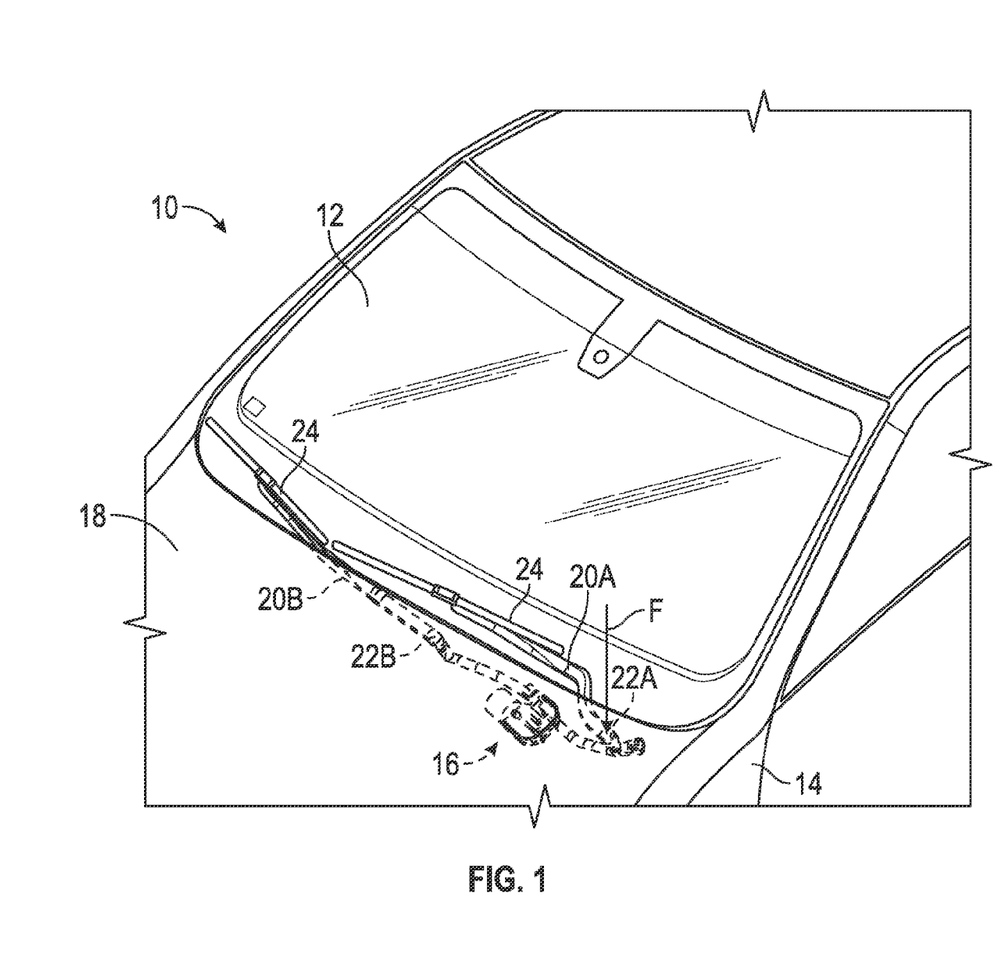
FIG. 1 is a schematic illustration in fragmentary perspective view of a vehicle having a windshield wiper system.

Referring to the drawings, wherein like reference numbers refer to like components throughout the several views, FIG. 1 shows a vehicle 10 that has a windshield 12 supported by a vehicle body 14. A windshield wiper system 16 is supported by one or more structural support members such as the body 14 or by the vehicle frame. The windshield wiper system is partially under the vehicle hood 18. The windshield wiper system 16 is shown in greater detail in FIG. 2, and is described further herein. The windshield wiper system 16 includes first and second wiper arms 20A, 20B mounted to wiper arm pivot shafts 22A, 22B, referred to herein as a first pivot shaft 22A and a second pivot shaft 22B. The wiper arms 20A, 20B are configured to oscillate relative to the windshield 12 when the pivot shafts 22A, 22B pivot. Each wiper arm 20A, 20B has a wiper blade 24 that contacts the windshield 12 to clear precipitation or other materials from the windshield 12.

The pivot shafts 22A, 22B extend generally outward and upward from the vehicle 10. In the embodiment of FIG. 1, both pivot shafts 22A, 22B are under the hood 18. Alternatively, the pivot shafts 22A, 22B could be exposed and just rearward of the hood 18 and forward of the windshield 12. The pivot shafts 22A, 22B each pivot about a respective first and second pivot axis P1, P2 (shown in FIG. 3). The first pivot axis P1 extends along the length of the first pivot shaft 22A. The second pivot axis P2 extends along the length of the second pivot shaft 22B. The windshield wiper system 16 is viewed from an opposite side in FIG. 3 relative to FIG. 1, and the wiper arms 20 are removed from the pivot shafts 22A, 22B.

As described further herein, the windshield wiper system 16 includes an energy-absorbing feature that is arranged relative to one or both of the pivot shafts 22A, 22B so that an external force F of at least a predetermined magnitude that is applied to either pivot shaft 22A, 22B along the respective pivot axis P1, P2 will cause that pivot shaft 22A, 22B to move away from the force F. The external force F is applied to either or both pivot shafts 22A, 22B through the vehicle hood 18 in FIG. 1. Although shown in FIGS. 1 and 3 as being in alignment with the pivot axis P1 of the pivot shaft 22A (pivot axis P1 shown in FIG. 3), the external force F can represent only the component of a force applied in a different direction, with the component force being along the pivot axis P1. Many different energy-absorbing features are described herein. The energy-absorbing feature thus absorbs energy of the external force F and allows the pivot shaft 22A to move along the pivot axis P1 in the direction of the external force F. In many embodiments, the energy-absorbing feature also enables the windshield wiper system to return to its original state when the force F is removed without requiring replacement of any of the components of the windshield wiper system.

Figure 2:
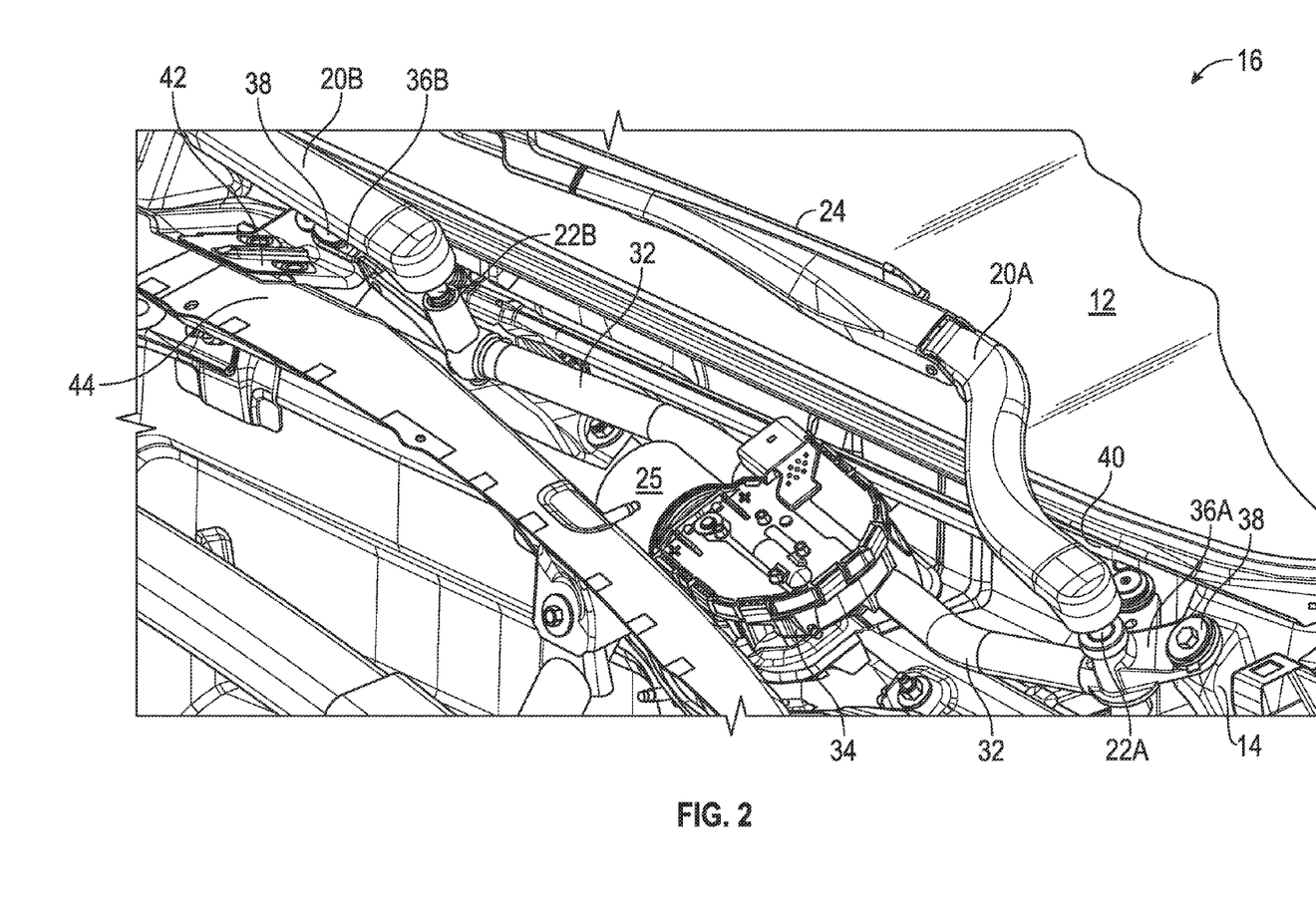
FIG. 2 is a schematic illustration in fragmentary perspective view of the vehicle of FIG. 1 with the vehicle hood removed.
Figure 3:
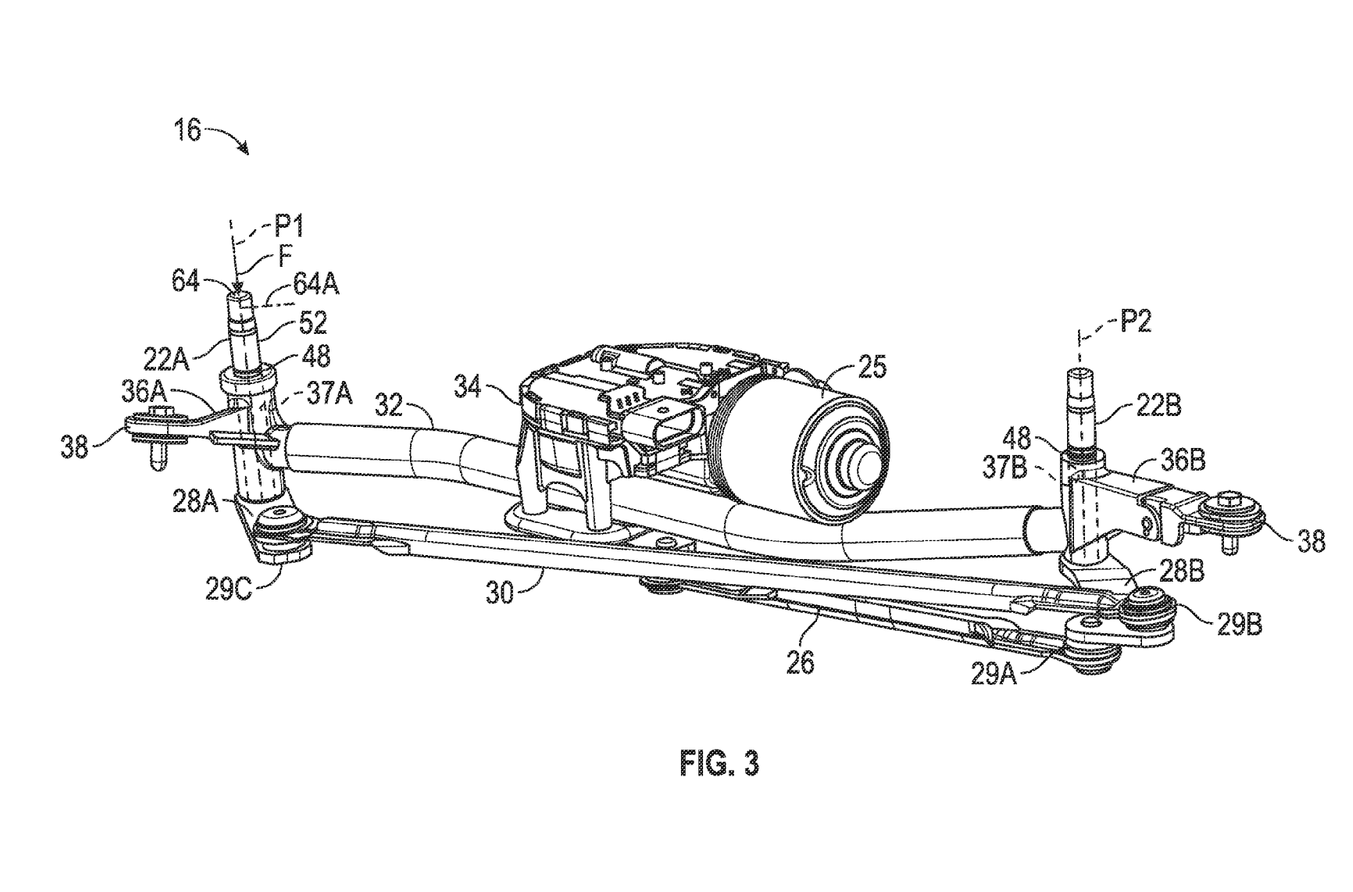
FIG. 3 is a schematic perspective illustration of the windshield wiper system of FIG. 1 with the wiper arms removed.

Referring to FIGS. 2 and 3, the windshield wiper system 16 has a drive system that includes a power source, such as an electric motor 25. Rotational motion of a motor shaft of the electric motor 25 drives the pivot shafts 22A, 22B to repeatedly pivot about a predefined range of motion to provide the alternating pivoting motion of the wiper arms 20A, 20B. A series of linkages connects a motor shaft of the motor 25 to the pivot shafts 22A, 22B. In the embodiment shown, a drive link 26 is shifted back and forth by a gear driven by the motor 25. The drive link 26 in turn pivots the pivot shaft 22B via a pivot lever 28B to which it is connected at a ball socket 29A to the drive link 26. The pivot lever 28B transfers motion to the other pivot shaft 22A through a pivot link 30 and a second pivot lever 28A, each of which is connected by a respective ball socket 29B, 29C. It should be appreciated that the present teachings are not limited to a windshield wiper system with the specific motor 25 and linkages as shown. For example, in other embodiments, windshield wiper systems with two separate motors to drive the separate wiper arm pivot shafts 22A, 22B can be used, and different linkage arrangements can be used. Other linkage arrangements may be used instead, and the linkage arrangement shown in FIG. 2 is a nonlimiting example of only one linkage arrangement.

Figure 4:
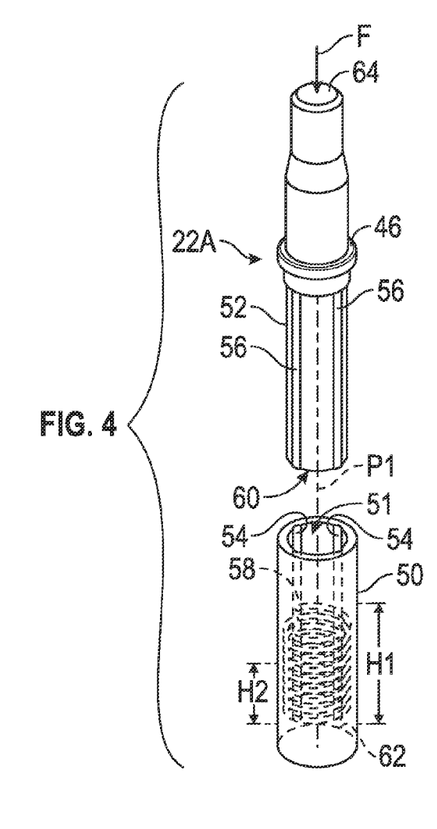
FIG. 4 is a schematic illustration in perspective exploded view of a first embodiment of a wiper arm pivot shaft for use in the windshield wiper system of FIGS. 1-3.

A stationary support member 32 supports the motor 25 via a motor support bracket 34 shown in FIG. 2. The stationary support member 32 also partially supports the pivot shafts 22A, 22B and spaces them in a predetermined arrangement relative to the motor 25. Each pivot shaft 22A, 22B is further supported by a pivot shaft holder 36A, 36B. The first pivot shaft 22A is supported in a cavity 37A of the first pivot shaft holder 36A shown in FIG. 3. The second pivot shaft 22B is supported in a cavity 37B of the second pivot shaft holder 36B. The pivot shafts 22A, 22B can be inserted into the cavities 37A, 37B from a lower end of each cavity adjacent the pivot levers 28A, 28B in FIG. 3. The pivot levers 28A, 28B are then inserted below the pivot shafts holders 36A, 36B to hold the pivot shafts 22A, 22B in the cavities 37A, 37B. The pivot shafts 22A, 22B are further retained in the cavities 37A, 37B by a flange 46, such as shown in FIG. 4 on pivot shaft 22A that fits in the cavity 37A from below but cannot fit through an opening in the pivot shaft holder 36A at an end of the cavity 37A. The pivot shaft holders 36A, 36B can also have a groove 48 adjacent the flange 46, or can be configured with only the groove 48 and without a flange 46. A snap ring can be placed around the groove 48 after the pivot shafts 22A, 22B are placed in the cavities 37A, 37B so that the snap ring retains the pivot shaft 22A or 22B in an axial position relative to the pivot shaft holder 36A or 36B, as is understood by those skilled in the art.

The pivot shaft holders 36A, 36B are each attached to a mount feature 38 as described herein. The mount feature 38 is bolted or otherwise fixed to a vehicle structural support member, such as a vehicle frame member or a portion of the vehicle body 14, to fix the pivot shafts 22A, 22B relative to the vehicle body 14 of FIG. 1. FIG. 2 shows the mount feature 38 and pivot shaft holder 36A supported by a wall 40 that separates the engine compartment from the vehicle passenger compartment. FIG. 2 also shows the mount feature 38 and the pivot shaft holder 36B supported via a bracket 42 connected to a transverse support member 44.

Figure 5:
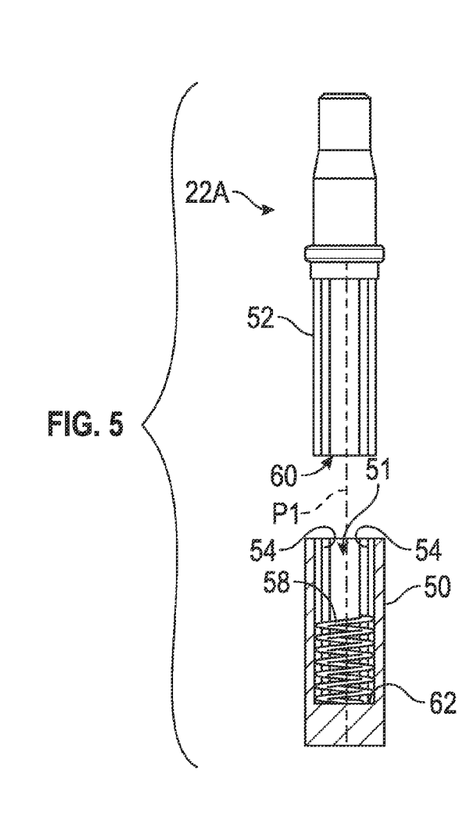
FIG. 5 is a schematic illustration in partial cross-sectional and exploded side view of the pivot shaft of FIG. 4.

FIGS. 4 and 5 show one embodiment of a pivot shaft 22A. The pivot shaft 22A has a first shaft portion 50 and a second shaft portion 52. The second shaft portion 52 can be operatively connected to the first shaft portion 50 so that the first and the second shaft portions 50, 52 pivot in unison about the pivot axis P1. FIG. 3 represents the pivot shaft 22A when the second shaft portion 52 is fit to the first shaft portion 50. The first shaft portion 50 is not visible in FIG. 3, as it is contained in the cavity 37A. FIGS. 4 and 5 show that the first shaft portion 50 is tubular, forming a cavity 51, and has internal splines 54. The second shaft portion 52 has external splines 56 and is sized so that the second shaft portion 52 fits within the cavity 51 and the external splines 56 fit to the first shaft portion 50 at the internal splines 54. The cavity 51 of the first shaft portion 50 is configured to contain the energy-absorbing feature, which in this embodiment is a biasing element that is a compression spring 58. The compression spring 58 is compressed between an end surface 60 of the second shaft portion 52 and an end wall 62 of the first shaft portion 50 when the external force F is applied to the second shaft portion 52. The compression spring 58 biases the second shaft portion 52 away from the first shaft portion 50, but the second shaft portion 52 overcomes the bias to move toward the first shaft portion 50 along the pivot axis P1 when the external force F is applied. For example, if the spring 58 compresses from a height H1 to a height H2 in FIG. 4, the distal end 64 of the second shaft portion 52 would move from the position shown in FIG. 3 to a second position 64A. Movement of the second shaft portion 52 and compression of the spring 58 absorbs at least a portion of the energy of the force F. The pivot shaft 22B may be identical to pivot shaft 22A shown in FIGS. 4 and 5, and may have a compression spring 58 as well.

Figure 6:
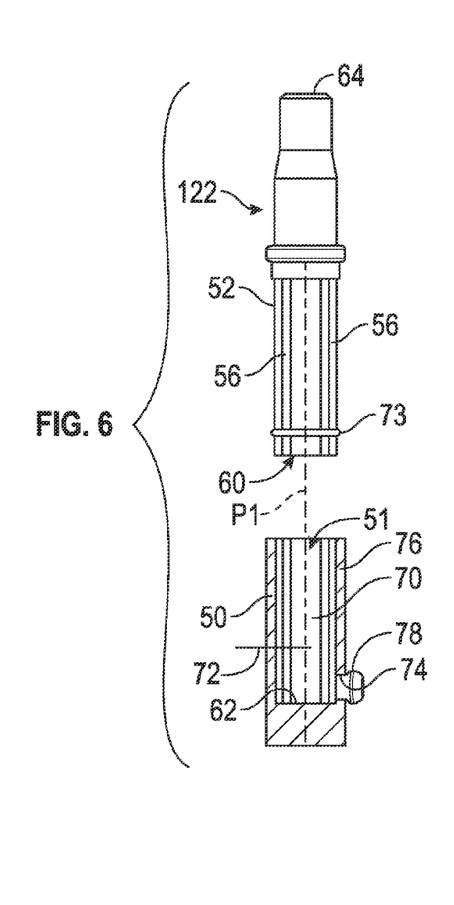
FIG. 6 is a schematic illustration in partial cross-sectional and exploded side view of a second embodiment of a wiper arm pivot shaft for use in the windshield wiper system of FIGS. 1-3, in accordance of an alternative aspect of the present teachings.

FIG. 6 shows another embodiment of a pivot shaft 122 that can be used in place of pivot shafts 22A, 22B in the windshield wiper system 16 of FIGS. 1-3. The pivot shaft 122 is alike in many aspects to the pivot shaft 22A shown in FIGS. 1-3, as indicated with like reference numbers. For example, the first shaft portion 50 is internally splined and the second shaft portion 52 is externally splined to fit to the first shaft portion 50 to pivot in unison about pivot axis P1 when driven by the motor 25 through the linkage system of FIG. 1. Instead of the spring 58 of FIGS. 3 and 4, the energy-absorbing feature is a fluid chamber 70 defined between the first and the second shaft portions 50, 52 along the pivot axis P1. Specifically, when the second shaft portion 52 is fit to the first shaft portion 50, the end surface 60 of the second shaft portion 52 will be positioned within the cavity 51 at axial position 72. The fluid chamber 70 below axial position 72 is filled with a gaseous or liquid fluid that biases the second portion 52 away from the first portion 50 along the pivot axis P1. That is, the second portion 52 is biased to the axial position 72, with the end surface 60 biased away from the bottom wall 62 by the contained fluid. An O-ring seal 73 may be used around the exterior of the splined second shaft portion 52 near the end surface 60 to prevent the fluid from traveling from the cavity 51 between the second shaft portion 52 and the first shaft portion 50 at the splines when the second shaft portion 52 is fit to the first shaft portion 50.

When the force F is applied along the pivot axis P1, the fluid will be compressed, if it is compressible, to allow the second shaft portion 52 to move along the pivot axis P1 toward the bottom wall 62. The first shaft portion 50 has an opening 74 in an annular wall 76 (i.e., the internally splined wall). A plug 78 is configured to plug the opening 74, and is configured to be expelled from the opening 74 when the external force F is at least a predetermined magnitude. In other words, if the fluid is incompressible, or if the force F compresses the fluid sufficiently, the plug 78 will blow out of the opening 74, and the fluid will be expelled through the opening 74 in the annular wall 76 of the first shaft portion 50. Compression of the fluid and expulsion of the fluid, if such occurs, allows the second shaft portion 52 to move along the pivot axis P1 toward the first shaft portion 50, and absorbs energy of the applied force F.

Figure 7:
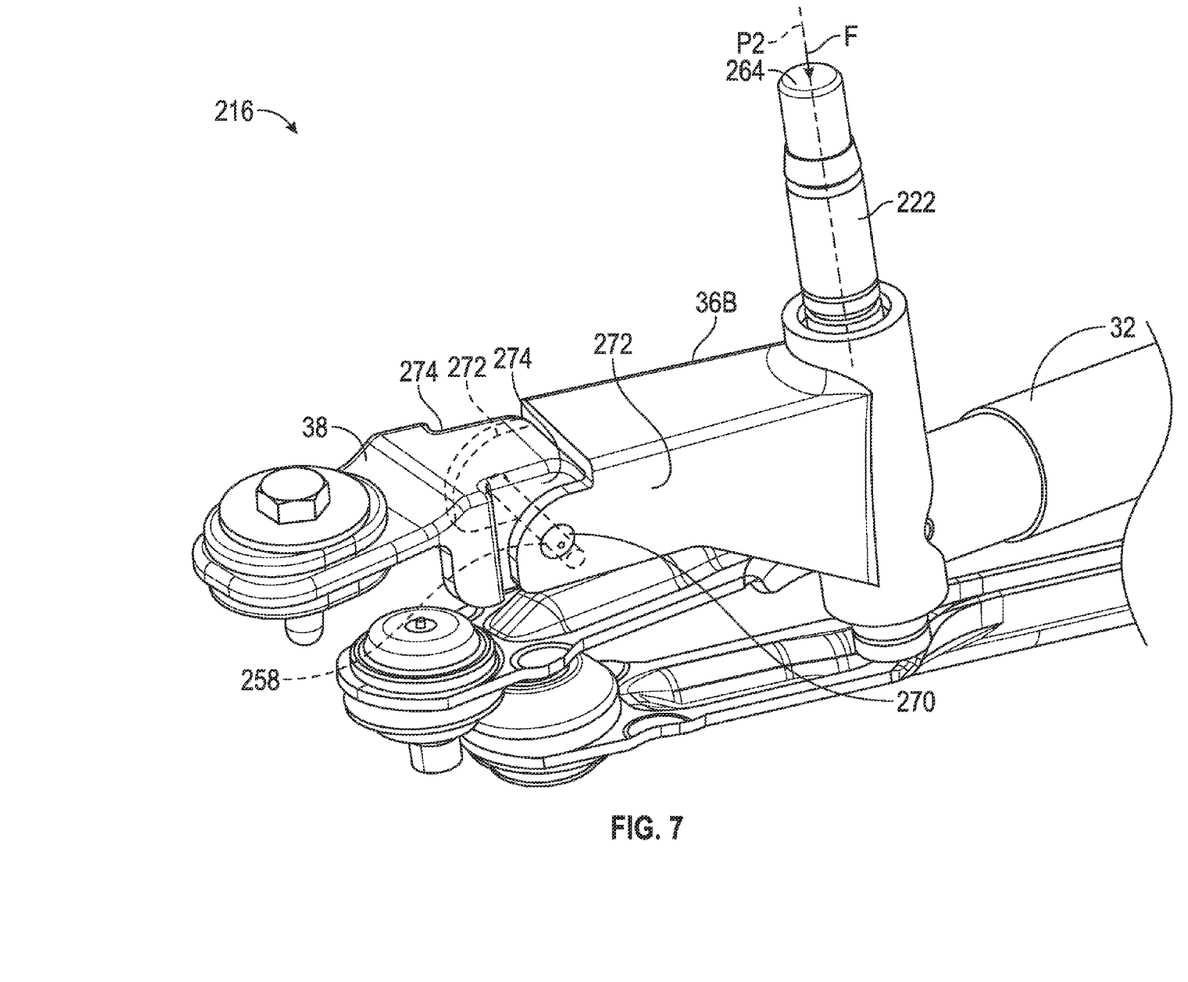
FIG. 7 is a schematic illustration in fragmentary perspective view of a portion of an alternative windshield wiper system for the vehicle of FIG. 1 in accordance with an alternative aspect of the present teachings.

FIG. 7 shows a portion of an alternative windshield wiper system 216 that can be used in place of windshield wiper system 16 in the vehicle 10 of FIG. 1. The windshield wiper system 216 has all of the same components as the windshield wiper system 16, except the pivot shafts 22A, 22B are replaced with a solid pivot shaft 222, and a shear pin 258 is used as an energy-absorbing feature. The pivot shaft 222 is a unitary solid component pivotable about pivot axis P2 when driven by the motor 25 and linkage system shown in FIG. 1. Alternatively, either of the pivot shafts 22A, 122 can be used in the windshield wiper system 216.

The shear pin 258 fixes the mount feature 38 to the pivot shaft holder 36B and prevents substantial movement of these components relative to one another. A slight degree of pivoting of the mount feature 38 is permitted about an interface of the mount feature 38 and the pivot shaft holder 36B at a recess 270 of the mount feature 36B. However, the shear pin 258 prevents significant axial movement of the pivot shaft holder 36B in the direction of the force F when the shear pin 258 is intact. The shear pin 258 can extend through openings in walls 274 of the mount feature 38 into a recess 270 in the inner surface of side walls 272 (one side wall 272 visible in FIG. 7) of the pivot shaft holder 36B. The side walls 272 are adjacent to the walls 274 of the mount feature 38. Alternatively, the pivot shaft holder 36B can also have openings that align with the openings in the walls 274 of the mount feature 38.

When the force F applied to a distal end 264 of the pivot shaft 222 is at least a predetermined magnitude, the shear pin 258 will fracture and slip out of the side walls 272, 274, thereby allowing both the pivot shaft 272 and the pivot shaft holder 36B to move away from the external force F. That is, the pivot shaft 222 and the pivot shaft holder 36B will move in the direction of the force F along the pivot axis P2. Additionally, fracturing of the shear pin 258 will absorb some of the energy of the external force F. The pivot shaft holder 36B and the mount feature 38 can be repositioned in their original positions when the external force F is removed, and the relatively inexpensive shear pin 258 can be replaced with a new shear pin.

Figure 8:
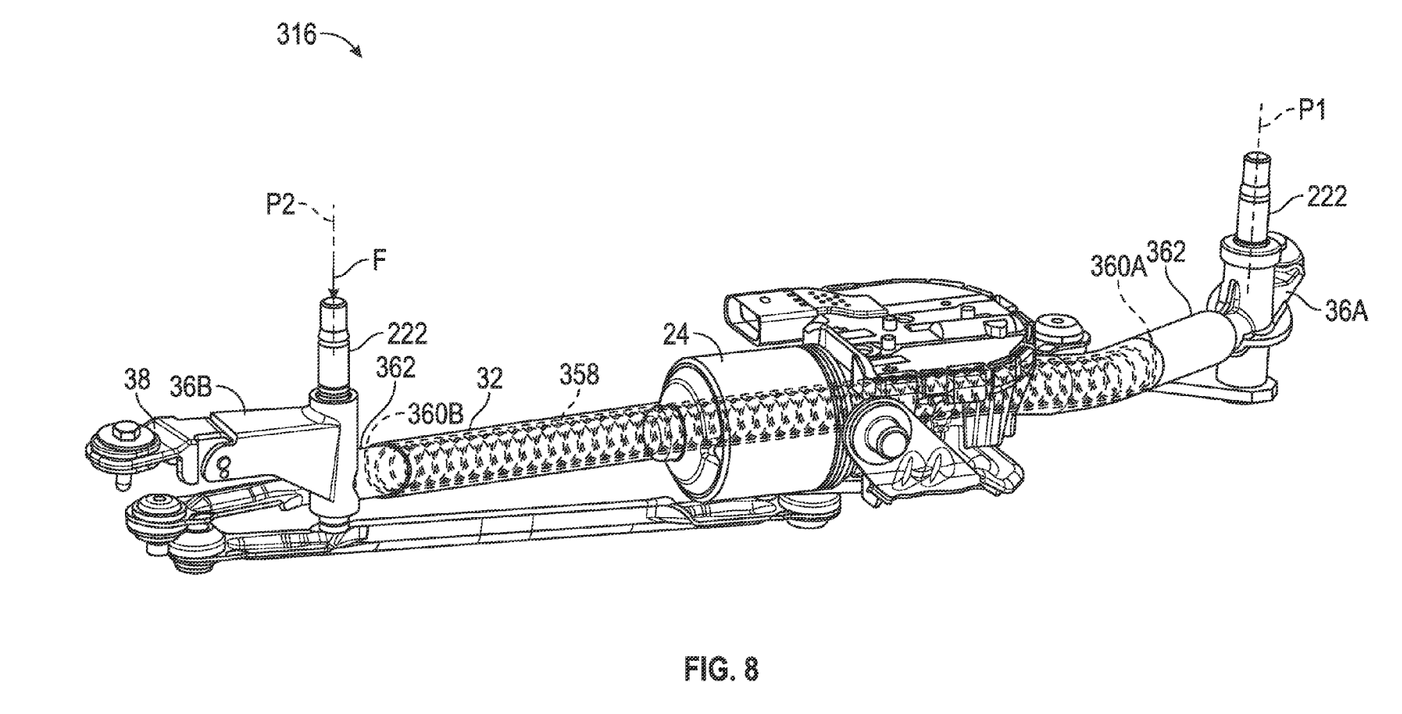
FIG. 8 is a schematic perspective illustration of an alternative windshield wiper system for the vehicle of FIG. 1 in accordance with an alternative aspect of the present teachings.

FIG. 8 shows another embodiment of a windshield wiper system 316 for use in the vehicle 10 of FIG. 1 in place of the windshield wiper system 16. The windshield wiper system 316 is alike in all aspects to the windshield wiper system 16, except the pivot shafts 22A, 22B, are replaced with the solid pivot shafts 222 described with respect to FIG. 7, and an energy-absorbing feature in the form of an internal spring 358 is used to allow the pivot shafts 222 to move in the direction of the force F along the pivot axes P1, P2 when the force F is of at least a predetermined magnitude. In other words, the spring 358 allows the pivot shafts 222 to move away from the applied force F. If the force F is applied to only one of the pivot shafts 222, only that pivot shaft 222 will move significantly away from the force F. Alternatively, either of the pivot shafts 22A, 122 can be used in the windshield wiper system 316.

The internal spring 358 extends along a length of the stationary support member 32. The stationary support member 32 is a hollow tube, and the spring 358 is positioned inside of the stationary support member 32. A first end 360A of the spring 358 is fixed to an extension 362 of the pivot shaft holder 36A that extends into the stationary support member 32. A second end 360B of the spring 358 is fixed to a similar extension 362 of the pivot shaft holder 36B that extends into the stationary support member 32. The spring 358 can either be in extension or in compression when in the position of FIG. 8 prior to application of the external force F. The fit of each of the extensions 362 inside of the stationary support member 32 is relatively loose, permitting some movement of the stationary support member 32 relative to the extensions 362 when a force F is applied to either or both pivot shafts 222, as described herein. When an external force F is applied to either or both of the pivot shafts 222, the spring 358 enables the pivot shaft 222 to which the force F is applied to move in the direction of the force F, along the respective pivots axis P1 or P2, away from the force F. The spring 358 flexes to absorb some of the energy of the applied force F, and is resilient, thereby returning the pivot shafts 222 and the pivot shaft holders 36A, 36B to their initial positions when the force F is removed.

Figure 9:
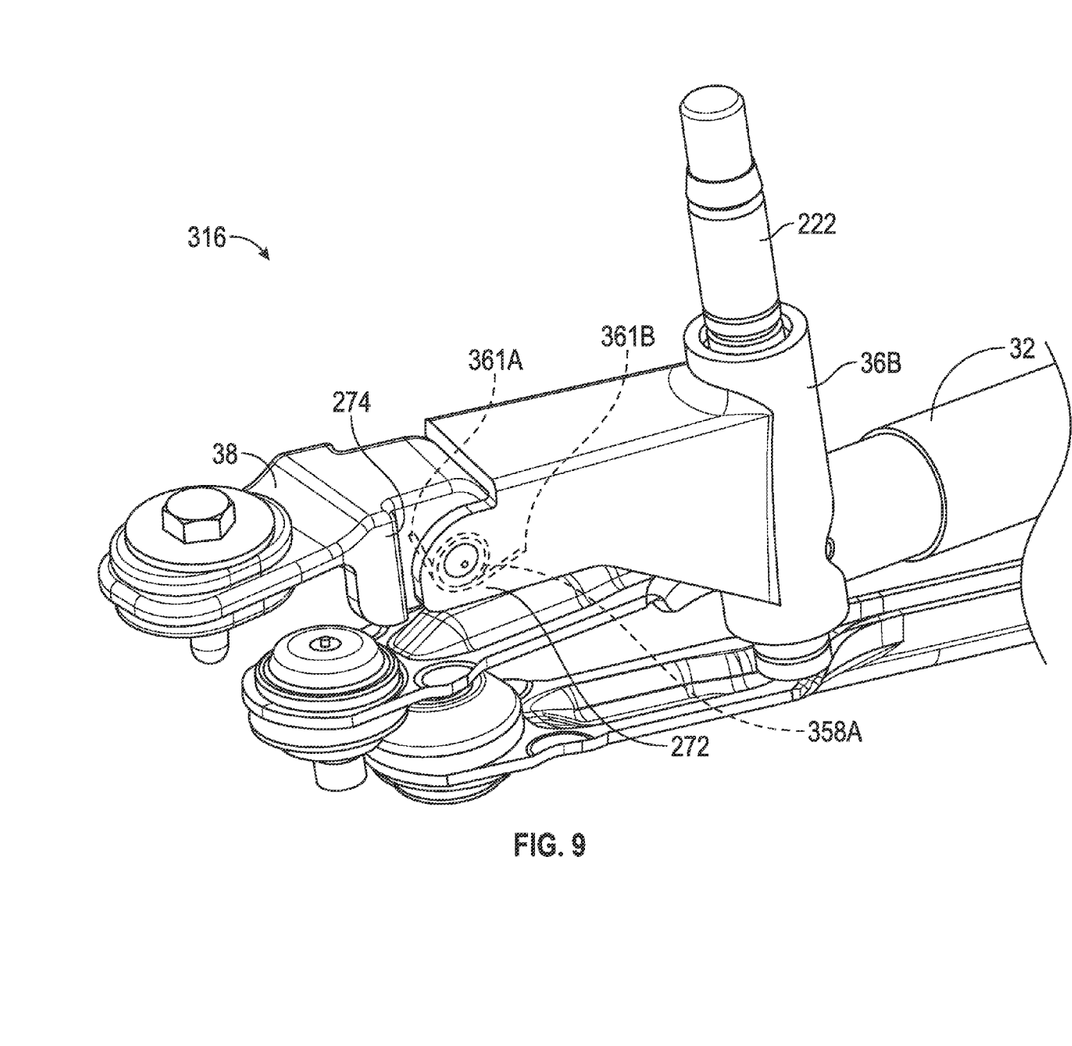
FIG. 9 is a schematic perspective fragmentary view of a portion of the windshield wiper system of FIG. 8.

FIG. 9 shows a portion of the windshield wiper system 316 of FIG. 8. A torsion spring 358A is used as an additional energy-absorbing feature. The torsion spring 358A has one end 361A fixed to the inside of the wall 274 of the mount feature 38 or elsewhere on the mount feature 38. The torsion spring 358A has another end 361B fixed to the inside of the wall 272 of the pivot shaft holder 36B or elsewhere on the pivot shaft holder 36B. The torsion spring 358A biases the pivot shaft holder 36B to the position shown in FIG. 9, so that when the force F is removed from the pivot shaft 222, the torsion spring 358A assists the spring 358 in returning the stationary support member 32, the pivot shaft holder 36B and the pivot shaft 222 to the initial positions shown in FIG. 9, which are the positions prior to application of the external force F. The pivot shaft holder 36A and the mount feature 38 attached thereto could also have a torsion spring mounted therebetween like torsion spring 358A. The torsion spring 358A could be used in any of the other windshield wiper systems described herein as well, or could be used with a traditional windshield wiper system.

Figure 10:
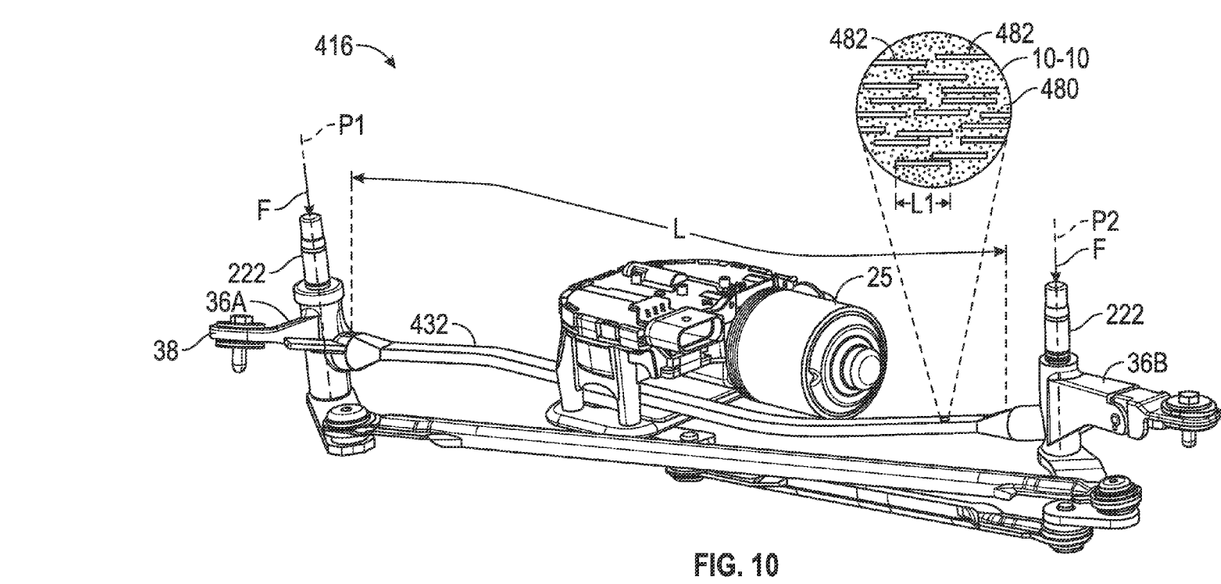
FIG. 10 is a schematic perspective view of an alternative windshield wiper system for the vehicle of FIG. 1 in accordance with an alternative aspect of the present teachings.

FIG. 10 shows another embodiment of a windshield wiper system 416 for use in the vehicle 10 of FIG. 1 in place of windshield wiper system 16. The windshield wiper system 416 is alike in all aspects to the windshield wiper system 316 of FIG. 8, except that a different stationary support member 432 is used instead of the stationary support member 32 and spring 358. The stationary support member 432 is a relatively flat, elongated member that may be rectangular in cross-section. The structural support member 432 is a material that is a matrix with a plastic base material 480, represented by a stippled portion, with directionally-oriented glass fibers 482, as shown enlarged in circle 10-10. The structural support member 432 can be injection molded, with the glass fibers 482 arranged to extend lengthwise generally transversely in a vehicle (i.e., cross-car, which is referred to as the Y-axis of the vehicle) when the windshield wiper system 416 is installed in the vehicle. The directional orientation of the fibers 482 is generally along the length of the stationary support member 432. In other words, the length L1 of the fibers 482 is generally parallel with the length L of the stationary support member 432. The length L is along a nonlinear center axis of the stationary support member 432, as indicated in FIG. 10.

As is understood by those skilled in the material arts, arranging the glass fibers 482 in this manner provides the stationary support member 432 with sufficient shear and tensile load strength, and also allows the stationary support member 432 to function as a leaf spring, providing the ability to flex in response to the external force F applied to one or both of the pivot shafts 222. For example, if force F is applied to the pivot shaft 222 supported in pivot shaft holder 36B, and not to the pivot shaft 222 supported in the pivot shaft holder 36A, then the pivot shaft 222 and pivot shaft holder 36B will move down in FIG. 10, along the pivot axis P2, in the direction of the force F. The end of the stationary support member 432 adjacent the pivot shaft holder 36B will flex downward with the pivot shaft holder 36B, and the stationary support member 432 will return to its position of FIG. 10 when the force F is removed. The directionally-oriented glass fibers 482 enable the stationary support member 432 to function as a leaf spring between the pivot shaft holders 36A, 36B.

Figure 11:
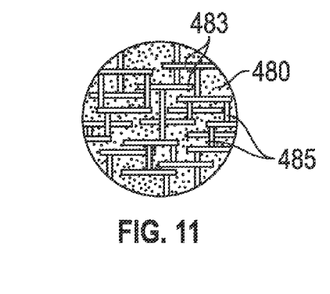
FIG. 11 is a schematic illustration in close-up fragmentary view of an alternative material for a structural support member of the windshield wiper system of FIG. 10.

FIG. 11 shows alternative materials that may be used in the structural support member 432. The structural support member 432 may be a matrix of a plastic base material 480 with woven layers of carbon fibers. A first layer of carbon fibers 483 is arranged to extend lengthwise generally transversely in a vehicle (i.e., cross-car, which is referred to as the Y-axis of the vehicle) when the windshield wiper system 416 is installed in the vehicle. A second layer of carbon fibers 485 is woven with the first layer so that the carbon fibers 485 of the second layer extend generally fore-aft in the vehicle when the windshield wiper system 416 is installed on a vehicle (i.e., along the X-axis of the vehicle). Similar first and second layers of carbon fibers are repeated in the plastic base material 480, giving the structural support member 432 sufficient shear and tensile load strength, and also allowing the stationary support member 432 to function as a leaf spring, providing the ability to flex in response to the external force F applied to one or both of the pivot shafts 222.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A windshield wiper system for a vehicle comprising:
a wiper arm pivot shaft having a pivot axis extending through the pivot shaft;
an energy-absorbing feature arranged to absorb energy of an external force applied to the wiper arm pivot shaft, thereby enabling the wiper arm pivot shaft to move away from the external force;
a pivot shaft holder having a cavity; wherein the pivot shaft holder is configured to support the pivot shaft in the cavity so that the pivot shaft is pivotable about the pivot axis relative to the pivot shaft holder;
a mount feature adapted for attachment to a vehicle structural support member;
wherein the energy-absorbing feature is a shear pin operatively fixing the pivot shaft holder to the mount feature;
wherein the shear pin is displaced laterally from the pivot axis; and
wherein the shear pin is configured to shear when the external force is at least a predetermined magnitude.

2. The windshield wiper system of claim 1, further comprising:
a torsion spring connected to the mount feature and to the pivot shaft holder; and
wherein the torsion spring is configured so that the pivot shaft holder returns to an initial position when the force is removed.

3. A windshield wiper system for a vehicle comprising:
a wiper arm pivot shaft having a pivot axis extending through the wiper arm pivot shaft; wherein the wiper arm pivot shaft has a first shaft portion that has an end wall; wherein the wiper arm pivot shaft has a second shaft portion that fits to the first shaft portion so that the second shaft portion pivots in unison with the first shaft portion about the pivot axis; and
a biasing element positioned in the first shaft portion against the end wall and configured to bias the second shaft portion away from the end wall so that the second shaft portion moves against the biasing element toward the end wall when an external force is applied to the second shaft portion.

4. The windshield wiper system of claim 3, wherein the second shaft portion has a surface facing the end wall of the outer shaft portion when the second shaft portion is fit to the first shaft portion; and
wherein the biasing element is a compression spring that is compressed between the surface of the second shaft portion and the end wall of the first shaft portion when the external force is applied to the second shaft portion.

5. The windshield wiper system of claim 4, wherein the first shaft portion is tubular with internal splines; and wherein the second shaft portion has external splines that fit to the internal splines of the first shaft portion so that the second shaft portion fits at least partially within the first shaft portion.

6. The windshield wiper system of claim 3, further comprising:
a pivot shaft holder having a cavity; wherein the pivot shaft holder is configured to support the pivot shaft in the cavity so that the pivot shaft is pivotable about the pivot axis relative to the pivot shaft holder;
a mount feature adapted for attachment to a vehicle structural support member;
a shear pin operatively fixing the pivot shaft holder to the mount feature; wherein the shear pin is displaced laterally from the pivot axis; and
wherein the shear pin is configured to shear when the external force is at least a predetermined magnitude.

7. The windshield wiper system of claim 3, further comprising:
a pivot shaft holder having a cavity; wherein the pivot shaft holder is configured to support the wiper arm pivot shaft in the cavity so that the wiper arm pivot shaft is pivotable about the pivot axis relative to the pivot shaft holder;
a mount feature adapted for attachment to a vehicle structural support member;
a torsion spring connected to the mount feature and to the pivot shaft holder; and
wherein the torsion spring is configured so that the pivot shaft holder returns to an initial position when the force is removed.

8. A vehicle comprising:
at least one vehicle structural support member;
a windshield supported by said at least one vehicle structural support member;
a windshield wiper system operatively mounted to the vehicle structural support member and having:
  a wiper arm pivot shaft holder operatively fixed to the vehicle structural support member;
  a first wiper arm pivot shaft pivotably supported by the wiper arm pivot shaft holder and configured to pivot about a first pivot axis through the first wiper arm pivot shaft;
  a wiper arm mounted to the first wiper arm pivot shaft and configured such that the first wiper arm pivot shaft oscillates relative to the windshield when the first wiper arm pivot shaft pivots;
  an energy-absorbing feature arranged to absorb energy of an external force applied to the first wiper arm pivot shaft so that the first wiper arm pivot shaft moves away from the external force;
  a second wiper arm pivot shaft;
  a first pivot shaft holder having a first cavity; wherein the first pivot shaft holder is configured to support the first pivot shaft in the first cavity so that the first pivot shaft is pivotable about the first pivot axis relative to the first pivot shaft holder;
  a second pivot shaft holder having a second cavity; wherein the second pivot shaft holder is configured to support the second pivot shaft in the second cavity so that the second pivot shaft is pivotable about the second pivot axis relative to the second pivot shaft holder;
  a support member operatively connected to and extending between the first and the second pivot shaft holders generally orthogonally to the pivot axes; and
  wherein the energy-absorbing feature extends in the support member between the first and the second pivot shaft holders.

9. The vehicle of claim 8, wherein the first shaft portion is internally splined and is configured to at least partially contain the biasing element; and
wherein the second shaft portion is externally splined and is configured to fit to the first portion at the internal splines.

10. The vehicle of claim 8, further comprising:
a mount feature attached to said at least one vehicle structural support member;
a shear pin operatively fixing the first pivot shaft holder to the mount feature; wherein the shear pin is displaced laterally from the pivot axis; and
wherein the shear pin is configured to shear when the external force is at least a predetermined magnitude.

11. The vehicle of claim 8,
wherein the energy-absorbing feature is a spring extending in the support member between the first and the second pivot shaft holders.

12. The windshield wiper system of claim 8,
wherein the support member is a plastic containing fibers that are arranged in the support member such that the support member functions as a leaf spring between the first and the second pivot shaft holders when the external force is applied to either of the first and the second pivot shaft holders.

13. The vehicle of claim 8, further comprising:
a mount feature attached to the vehicle structural support member;
a torsion spring connected to the mount feature and to the first pivot shaft holder; and
wherein the torsion spring is configured so that the first pivot shaft holder returns to an initial position when the force is removed.

* * * * *